United States Patent
Höhne et al.

(10) Patent No.: US 7,318,227 B1
(45) Date of Patent: Jan. 8, 2008

(54) METHOD FOR MONITORING OR INSTALLING NEW PROGRAM CODES IN AN INDUSTRIAL INSTALLATION

(75) Inventors: Joachim Höhne, Erlangen (DE); Thomas Heimke, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 513 days.

(21) Appl. No.: 10/019,719

(22) PCT Filed: Jul. 3, 2000

(86) PCT No.: PCT/DE00/02076

§ 371 (c)(1),
(2), (4) Date: Apr. 29, 2002

(87) PCT Pub. No.: WO01/02891

PCT Pub. Date: Jan. 11, 2001

(30) Foreign Application Priority Data

Jul. 2, 1999 (DE) ................................ 199 30 660

(51) Int. Cl.
*G06F 9/44* (2006.01)
*G06F 9/445* (2006.01)
*G06F 19/00* (2006.01)

(52) U.S. Cl. ............ 717/174; 717/127; 700/104; 700/108; 700/110

(58) Field of Classification Search ........... 709/208, 709/225, 250; 717/127, 171, 174–178; 712/29; 700/174, 9, 104, 108, 110; 370/316
See application file for complete search history.

(56) References Cited

U.S. PATENT DOCUMENTS

| | | | |
|---|---|---|---|
| 5,588,109 A | | 12/1996 | Dickinson et al. |
| 5,805,441 A | | 9/1998 | Crater et al. |
| 5,978,578 A | * | 11/1999 | Azarya et al. ............ 717/100 |
| 6,038,486 A | * | 3/2000 | Saitoh et al. ............ 700/96 |
| 6,055,562 A | * | 4/2000 | Devarakonda et al. ...... 709/202 |
| 6,151,625 A | * | 11/2000 | Swales et al. ............ 709/218 |
| 6,161,051 A | * | 12/2000 | Hafemann et al. ......... 700/86 |
| 6,240,335 B1 | * | 5/2001 | Wehrung et al. ......... 700/230 |

(Continued)

FOREIGN PATENT DOCUMENTS

DE 29600609 1/1996

(Continued)

OTHER PUBLICATIONS

Karygiannis, "Network Security Testing Using Mobile Agents," Mar. 1998.*

(Continued)

*Primary Examiner*—Meng-Al T. An
*Assistant Examiner*—Insun Kang
(74) *Attorney, Agent, or Firm*—Baker Botts L.L.P.

(57) ABSTRACT

A method of installing a mobile program code for the control of an industrial automation system with a central computer and a plurality of actors and sensors coupled via a bus system with said central installation computer, has the steps of transmitting the mobile program code from a remote location to the central computer of the industrial automation system, installing and commissioning the mobile program code independently on the industrial automation system, and generating by means of the mobile program code further mobile program codes having a defined task, and transmitting the further mobile program codes at least to said actors and sensors within the industrial automation system.

8 Claims, 1 Drawing Sheet

U.S. PATENT DOCUMENTS

| | | | |
|---|---|---|---|
| 6,263,487 B1 * | 7/2001 | Stripf et al. | 717/171 |
| 6,321,272 B1 * | 11/2001 | Swales | 709/250 |
| 6,334,146 B1 * | 12/2001 | Parasnis et al. | 709/217 |
| 6,374,296 B1 * | 4/2002 | Lim et al. | 709/225 |
| 6,415,315 B1 * | 7/2002 | Glass | 709/201 |
| 6,438,534 B1 * | 8/2002 | Sorgel | 706/61 |
| 6,446,192 B1 * | 9/2002 | Narasimhan et al. | 712/29 |
| 6,529,780 B1 * | 3/2003 | Soergel et al. | 700/10 |
| 6,553,009 B2 * | 4/2003 | Artzi | 370/316 |
| 6,772,033 B2 * | 8/2004 | Scherer et al. | 700/115 |
| 6,775,830 B1 * | 8/2004 | Matsunami et al. | 717/176 |
| 2002/0065898 A1 * | 5/2002 | Leontiev et al. | 709/208 |
| 2003/0139821 A1 * | 7/2003 | Papadopoulos et al. | 700/9 |
| 2003/0140107 A1 * | 7/2003 | Rezvani et al. | 709/208 |
| 2004/0153997 A1 * | 8/2004 | Anderson et al. | 717/127 |
| 2005/0010323 A1 * | 1/2005 | Cocciadiferro et al. | 700/174 |

FOREIGN PATENT DOCUMENTS

| | | |
|---|---|---|
| DE | 19615190 | 4/1996 |
| DE | 19725916 | 6/1997 |
| EP | 0825506 | 2/1998 |
| EP | 0903889 | 3/1999 |
| GB | 2149551 | 6/1985 |

OTHER PUBLICATIONS

Hohl et al, "Beyong Java: Merging Corba-based Mobile Agents and WWW," 1996.*

Lange, "Java Aglet Application Programming Interface," Feb. 1997.*

Vnners, "The architecture of aglets," JavaWorld, Apr. 1997.*

Lange, "Programming And Deploying Java Mobile Agents with Aglets," Aug. 1998.*

XP-000726280, "Factory Monitoring Via the Internet" Machine Design, U.S. Penton, Inc., Cleveland, p. 34.

Aglet-Konzept, D.B. Lange, M. Oshima: "Programming and Developing JAVA Mobile Agents with Aglets," Edison Wesley, 1998.

* cited by examiner

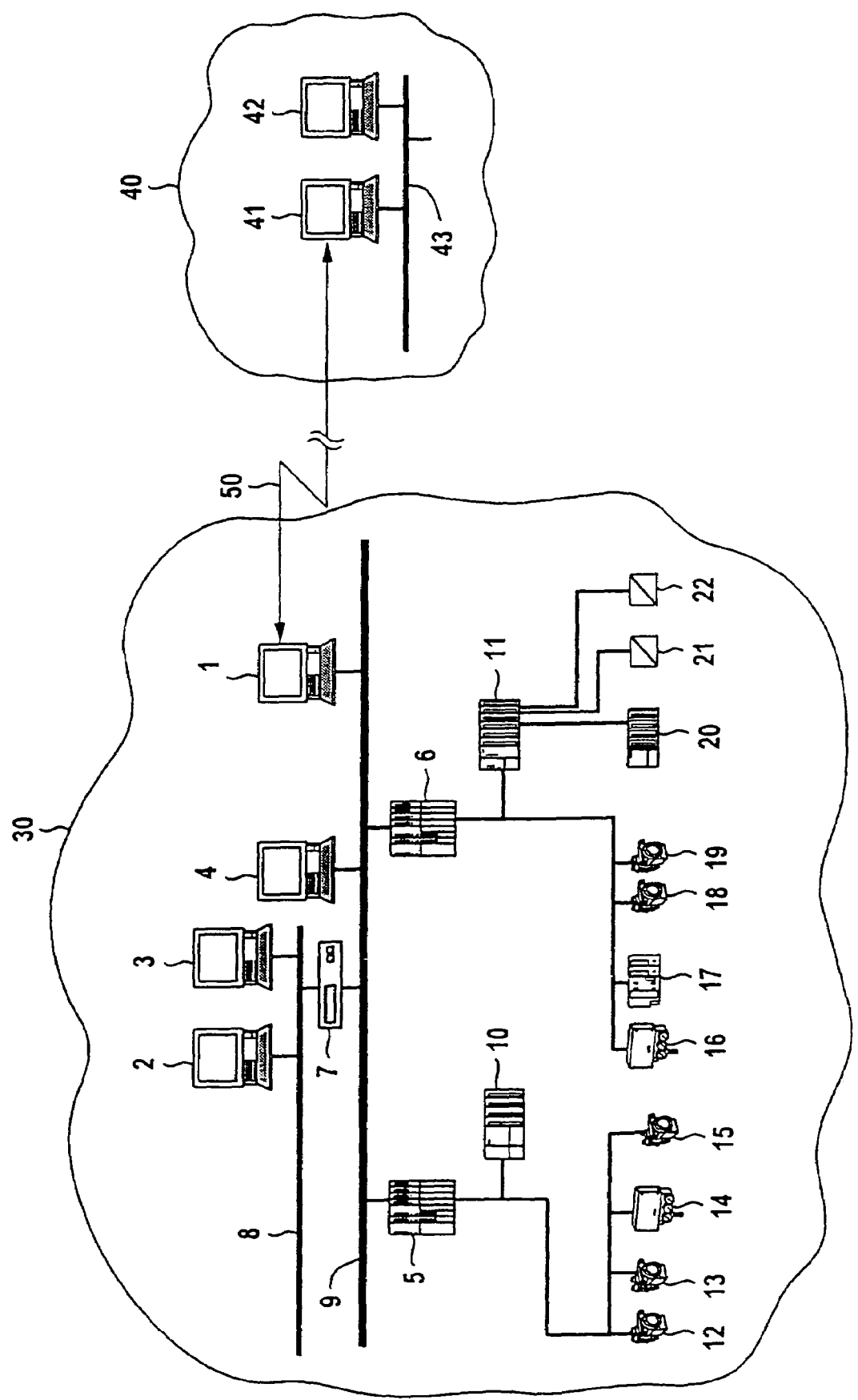

METHOD FOR MONITORING OR INSTALLING NEW PROGRAM CODES IN AN INDUSTRIAL INSTALLATION

FIELD OF THE INVENTION

The invention relates to a method of monitoring an industrial installation or installing new program codes in an industrial installation.

BACKGROUND OF THE INVENTION

It is known, for the purpose of remote monitoring of industrial installations, to evaluate appropriate process logs and log files from the automation systems of the installations. Decisions, for example as to how warning messages are to be reacted to, can therefore be made only after a relatively large time delay, since the evaluation of the information is basically carried out offline. Special problems arise, for example, when installations and evaluation centers are located in different time zones, or where appropriately qualified personnel are not available on a 24 hour basis. It is therefore possible for an evaluation to be carried out only after some amount of delay, and after the log files needed for the evaluation have already been overwritten. In addition, random evaluation, makes it difficult to react to all fault messages, since not all the information is transmitted. For this reason, complete and comprehensive remote monitoring of an industrial installation is possible only to a restricted extent. For industrial installations, particularly installations in the raw materials industry, it is additionally desirable to improve the installation of program codes, in particular control program codes, for the closed-loop and open-loop control of the industrial installation, and any subsystem.

SUMMARY OF THE INVENTION

Accordingly, it is an object of the invention to provide improved monitoring of a large industrial plant, through the use of a mobile program code for the closed-loop or open-loop control of an industrial installation, for example in the raw materials industry. The code is transmitted from an evaluation center or development center to the industrial installation which is installed and commissioned independently.

In a preferred embodiment of the present invention, the installed mobile program code generates further mobile program codes in accordance with a predefined task, with the program codes being transmitted within the industrial installation. A preferred mobile program code is JAVA program code.

In another preferred embodiment of the invention, information is transmitted between the evaluation center or the development center and the industrial installation, via ISDN, satellite or Internet.

In yet a further preferred embodiment, the mobile program code runs on hardware provided for the open-loop or closed-loop control of the industrial installation.

In a further embodiment of the invention, the installed mobile program code for the closed-loop and open-loop control of the industrial installation is designed to monitor the industrial installation. In this case, monitoring of an industrial installation is carried out by means of a mobile program code which monitors the industrial installation automatically for faults or special events. In the event of a fault or a special event, the information needed to evaluate the fault or the special event is transmitted by means of the mobile program code (or a further mobile program code) to an evaluation center separated physically from the industrial installation. Special events are to be understood as including violations of limiting values, trends, or the occurrence of regular print-outs of particular significance. Special events may also be a tolerance deviation of process data (strip profile faults, temperature faults, etc.), or special features in the convergence behavior in the adaptation of models. In this way, faster and more comprehensive evaluation of faults and special events is possible. It is further of particular advantage to carry out the recognition of trends of looming faults by means of the information determined by the mobile program code. This permits, for example, preventative maintenance of an installation.

In a further preferred embodiment of the present invention, the mobile program code forms and dispatches new mobile program code. The new mobile program code monitors parts of the industrial installation automatically for faults or special events. In the event of a fault or a special event, the information needed to evaluate the fault or the special event is transmitted directly to the evaluation center or to another mobile program code for further transmission to the evaluation center.

BRIEF DESCRIPTION OF THE DRAWINGS

The invention is described below in greater detail in connection with the drawing, in which:

FIG. 1 schematically illustrates an industrial installation having a control system and its actuators and sensors.

DETAILED DESCRIPTION OF THE INVENTION

The industrial installation 30 has an industrial Ethernet bus 9, which provides a data connection between two identically or differently configured automation devices 5 and 6, an operating computer 4 and a commissioning computer 1. The industrial Ethernet bus 9 is connected to a standard Ethernet bus 8 via a computer 7. An operating computer 2 and a central operating computer 3 are connected to the standard Ethernet bus 8. Via a bus system 23, which is designed as a Profibus, various actuators or sensors 12, 13, 14, 15 are provided with a data connection to the automation device 5. Furthermore, a decentralized peripheral 10 is connected to the automation device 6 via the bus system 23. Via a bus system 24, which is designed as a Profibus, various actuators or sensors 16, 17, 18, 19 are provided with a data connection to the automation device 6. Furthermore, a decentralized peripheral 11 is connected to the automation device 6 via the bus system 24. Via the decentralized peripheral 11, various actuators and sensors 20, 21, 22 can be driven or evaluated via the automation device 6. The operating computers 2, 3, 4, the automatic devices 5, 6, the decentralized peripherals 10, 11, the actuators or sensors 12, 13, 14, 15, 16, 17, 18, 19, 20, 21, 22 and the bus systems 8, 9, 23, 24 serve the operation of the industrial installation.

Reference number 40 designates an evaluation center that is physically remote from the industrial installation 30 and is advantageously also used as a development center. In an exemplary configuration, the evaluation center 40 has a computer system having, for example, a plurality of computers 41 and 42 coupled via a bus system 43. A communication link 50 provides a data connection between the industrial plant 30 and the evaluation center 40. In this case, this does not have to be a dedicated line. In an exemplary configuration, the industrial plant 30, and the evaluation center 40 have a data connection to each other via the commissioning computer 1 on the side of the industrial installation 30, and the computer 41 on the side of the evaluation center 40. In order to monitor the industrial installation 30, mobile program code is transmitted from the computer 41 to the commissioning computer 1. By means of the transmitted mobile program code, which runs on the commissioning computer 1, the other components 2, 3, 4, 5, 6, 7, 8, 9, 10, 11, 12, 13, 14, 15, 16, 17, 18, 19, 20, 21, 22 are monitored for faults or special events. For this purpose, the mobile program code operating on the commissioning computer 1 automatically generates further mobile program codes, which are transmitted from the commissioning computer 1 to the automation devices 5, 6, the decentralized peripherals 10 and 11, to the actuators or sensors 12, 13, 14, 15, 16, 17, 18, 19, 20, 21, 22, and if appropriate to the operating computers 2, 3, 4. If one of these transmitted mobile program codes detects a fault or the special event then this mobile program code transmits a communication relating to this fault or the special event, and also all the information needed for evaluation to the mobile program code installed on the commissioning computer 1, which sets up the communications link 50 to the computer 41 and then transmits this information to the computer 41. The transmitted information can be log files which are generated on the basis of warning and error messages, or it may be tolerance deviations of process data (for example, strip profile faults, temperature faults, etc.), adaptation coefficients or coefficients from neural networks and the states of computers (such as memories, hard disk capacity, and CPU loading). In addition, provision can be made to register the frequency of warning messages and to evaluate it statistically.

The mobile program code is preferably implemented in JAVA. This may be carried out by following the Aglet concept, as disclosed by D. B. Lange, M. Oshima: "Programming and Developing JAVA Mobile Agents with Aglets", Edison-Wesley, 1998. One preferred application of the invention is in rolling mills.

We claim:

1. A method of installing a mobile program code for the control of an industrial automation system in a raw materials industry comprising a central computer and a plurality of actors and sensors coupled via a bus system with said central computer, the method comprising the steps of:
    transmitting the mobile program code from a remote location to the central computer of the industrial automation system for monitoring a fault or special event;
    installing and commissioning the mobile program code independently on the industrial automation system;
    generating by means of the mobile program code further mobile program code having a defined task; and
    transmitting the further mobile program code at least to said actors and sensors to monitor the industrial automation system.

2. A method according to claim 1, wherein the mobile program code is transmitted between the remote location and the industrial automation system via ISDN, satellite, or Internet.

3. The method according to claim 1, wherein the mobile program code is JAVA program code.

4. The method according to claim 3, further comprising running the mobile program code on hardware provided for an open-loop or closed-loop control of the industrial automation system.

5. The method according to claim 1, further comprising independently monitoring the industrial automation system by means of the mobile program code for a fault or special event, in the event of which information needed to evaluate the fault or the special event is transmitted to the remote location by means of the mobile program code.

6. The method according to claim 1, wherein the industrial automation system further comprises automation devices located between said central computer and said actors and sensors.

7. The method according to claim 6, wherein the industrial automation system further comprises an industrial Ethernet bus for coupling said automation devices and said central computer.

8. The method according to claim 6, wherein the industrial automation system further comprises a Profibus for coupling said automation devices and said actors and sensors.

* * * * *